United States Patent
Fowler et al.

[11] Patent Number: 6,069,409
[45] Date of Patent: May 30, 2000

[54] WIND POWERED GENERATOR APPARATUS

[76] Inventors: Benjamin P. Fowler; Frederick Cruser Rowland, both of 2162 Gulf Terminal Dr., Houston, Tex. 77023

[21] Appl. No.: 09/149,505

[22] Filed: Sep. 8, 1998

[51] Int. Cl.[7] .................................................. F03D 3/04
[52] U.S. Cl. ........................................... 290/55; 290/44
[58] Field of Search .............................. 290/44, 43, 54, 290/55

[56] References Cited

U.S. PATENT DOCUMENTS

| | | |
|---|---|---|
| 648,442 | 5/1900 | Scott . |
| 1,233,232 | 7/1917 | Heyroth ................................. 290/55 |
| 4,191,505 | 3/1980 | Kaufman ................................ 415/2 |
| 4,302,684 | 11/1981 | Gogins ................................... 290/55 |
| 4,379,972 | 4/1983 | Sosa et al. .............................. 290/44 |
| 5,009,569 | 4/1991 | Hector, Sr. et al. ................ 415/4 R |
| 5,457,346 | 10/1995 | Blumberg et al. ..................... 290/55 |
| 5,472,311 | 12/1995 | Davis .................................... 415/4.1 |
| 5,910,688 | 6/1999 | Li ........................................... 290/55 |

*Primary Examiner*—Nicholas Ponomarenko
*Attorney, Agent, or Firm*—Harrison & Egbert

[57] ABSTRACT

A wind powered generator apparatus including a support member, a trim rotatably connected to the support member, a plurality of blade members pivotally connected around the rim, and a generator connected to the rim for producing an electrical output relative to a rotation of the rim. Each of the plurality of blade members is movable between a wind-capturing position and a wind-passing position as the rim rotates. A rotatable base is affixed to the end of the support member opposite the rim. A vane is affixed to the support member for moving the support member such that the axis of rotation of the rim is transverse to a direction of wind. Each of the blade members includes a panel, an arm extending inwardly from an end of the panel and pivotally connected to the rim, and a counterweight connected to the arm at the pivotal connection of the arm with the rim.

13 Claims, 3 Drawing Sheets

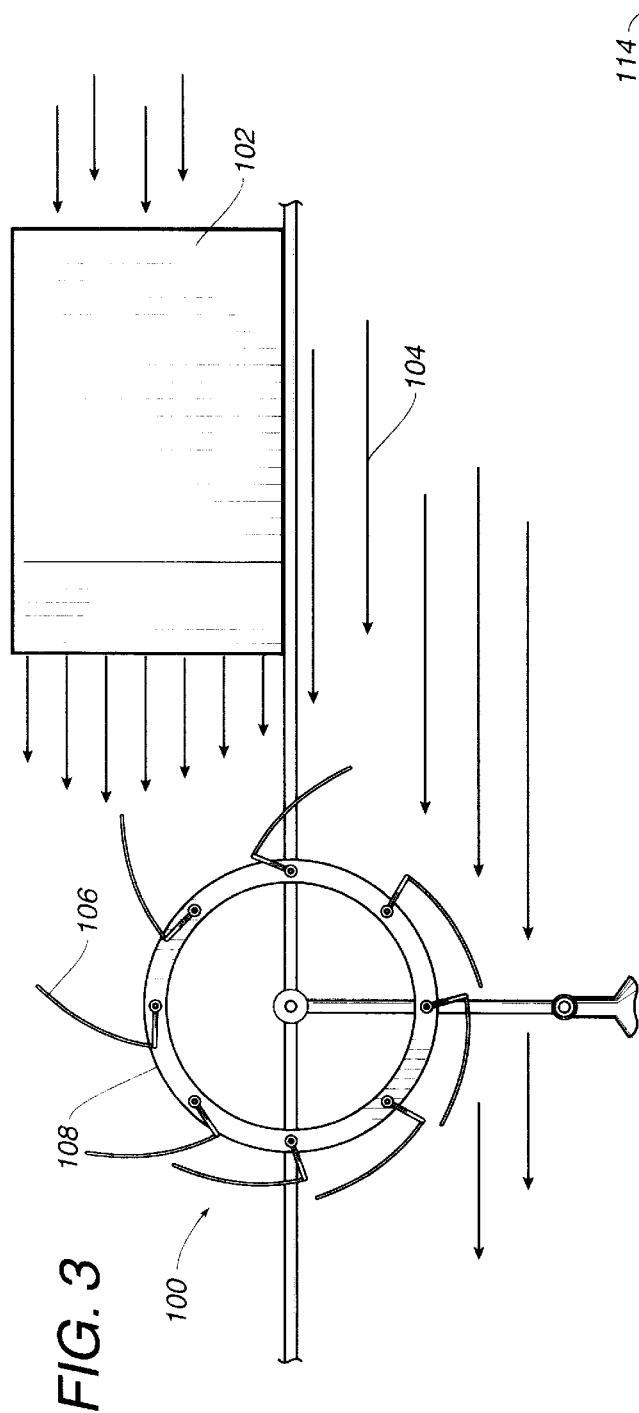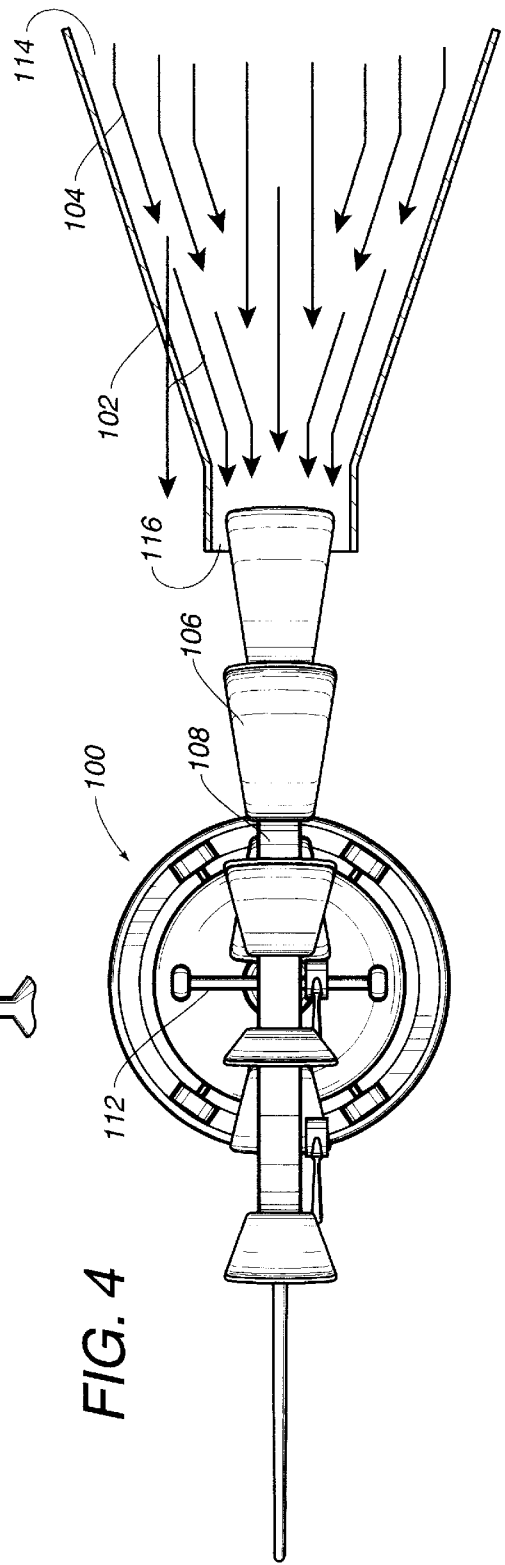

WIND POWERED GENERATOR APPARATUS

TECHNICAL FIELD

The present invention relates to apparatus for generating electrical energy. More particularly, the present invention relates to apparatus for generating electrical energy from the action of wind. Furthermore, the present invention relates to devices for producing energy by rotating in response to the velocity of wind.

BACKGROUND ART

The present invention relates in general to power generation devices, and, more in particular, to a winddriven power generation device.

windmills have been known since ancient times. These devices extract power from the wind. Usually, the power is used in driving pumps for irrigation or supplying electrical power in rural areas.

Some large scale wind turbines have been successful. One of these was the Smith-Flutnam wind turbine generator built in Vermont in the early 1940's. This system had a blade span of 175 feet and produced 1.25 megawatts of electricity in a 32 mile per hour wind. The unit was abandoned upon a blade failure in favor of conventional electrical generating plants that were more cost effective at that time. With the increase in energy costs, the attractiveness of wind power has improved.

Recently consideration has been given to using wind power generator to supply electrical energy for sophisticated requirements. A bost of problems, however, attend such an attempt. Wind is incredibly variable. Wind varies from geographical location to geographical location and from season to season. Some areas are blessed with a considerable amount of wind. Others are wind poor. Wind velocities and direction fluctuate broadly in short periods of time. In areas where considerable wind exists. The diurnal changes in wind velocity can vary from almost nothing to a considerable value. A mean wind speed is attendant with frequent gusts and lulls. The wind velocity varies considerably in elevation close to the ground.

The lack of constant wind from a constant direction makes power generation for electrical utility purposes seem difficult. Electrical power for utilities must be of extremely high quality. By way of example, a utility generated power must be held extremely close to 60 cycles per second. If it is not, the power is totally unsatisfactory. This means that in a wind generating system some means must exist to assure constant generator. Synchronous generators can obtain this end, but they must be powered by a system that supplied considerable power for all wind conditions if overall efficiencies are to be opened. The generators cannot be permitted to devote energy either to slowing down the drive or speeding up the drive. The generators motoring the drive system can also place unusual stresses on the roots of the propeller blades.

A considerable problem exists when the wind blows only in gusts. When the wind speed is minimal, typical wind power generating systems will simply shut down rather than cause the wind mill blades to spin at a very slow and inefficient speed. As such, it is desirable to maintain the blades in a spinning motion for as long as possible following a wind gust.

It is an object of the present invention to provide an apparatus for generating electrical energy relative to the action of wind.

It is another object of the present invention to provide a wind powered generator apparatus which is responsive to the action of wind in an optimal and efficient manner.

It is another object of the present invention to provide a wind powered generator apparatus which utilizes mechanical energy for facilitating the response to wind action.

These and other objects and advantages of the present invention will become apparent from a reading of the attached specification and appended claims.

SUMMARY OF THE INVENTION

The present invention is a wind powered generator apparatus including a support member, a rim rotatably connected to the support member and having an axis of rotation, a plurality of blade members pivotally connected to the rim, and a generator means connected to the rim for producing an electrical output relative to a rotation of the rim. Each of the plurality of blade members is movable between a wind-capturing position and a wind-passing position as said rim rotates.

In the present invention, a base is affixed to an end of the support member opposite the rim. The base is rotatably mounted within a track such that the base is movable relative to a direction of wind. The base includes a plurality of wheels that extend outwardly therefrom. These wheels are received within a circular track.

A vane is affixed to the support member for moving the support member such that the axis of rotation is transverse to a direction of wind. The vane includes a planar member extending outwardly from the support member transverse to a longitudinal axis of the support member. The vane is positioned below the rim.

Each of the plurality of blade members includes a panel and an arm extending inwardly from an end of the panel. The arm is pivotally connected to the rim. The panel will have a curved surface. The arm extends at an acute angle with respect to the surface of the panel. The arm has an end opposite the panel that is pivotally connected to the rim. A counterweight is connected to the arm for moving the panel from the wind-passing position to the wind-capturing position during a rotation of the rim. This counterweight is connected to the arm at the pivotal connection of the arm with the rim. A movement of the counterweight corresponds to a movement of the arm. The counterweight includes a strut which extends outwardly from the arm at an obtuse angle. The counterweight is a weight of not less than a weight of the panel and the arm.

One of the blade members is in overlapping relationship with a panel of an adjacent blade member in the wind-passing position. The panel will extend angularly outwardly of the rim in the wind-capturing position. The panel extends adjacent to the rim in the wind-passing position. Each of the plurality of blade members is evenly spaced from an adjacent blade member around the rim.

The rim is connected to a sprocket at the axis of rotation. The generator has a sprocket which is connected thereto. An endless belt is connected to the sprocket at the axis of rotation and to the sprocket of the generator. The sprocket at the axis of rotation is of a greater diameter than the sprocket of the generator.

In an alternative embodiment of the present invention, a venturi tube is positioned so as to have a longitudinal axis transverse to the axis of rotation of the rim. The venturi tube has a narrow end facing a portion of the plurality of blades. In particular, the venturi tube has an outlet facing a top half of the rim.

BRIEF DESCRIPTION OF THE DRAWINGS

FIG. 3 is a side diagrammatic illustration of an alternative embodiment of the wind powered generator apparatus of the present invention.

FIG. 4 is a plan view of the alternative embodiment of the wind powered generator apparatus illustrated in FIG. 3.

DETAILED DESCRIPTION OF THE PRESENT INVENTION

Figure 1:
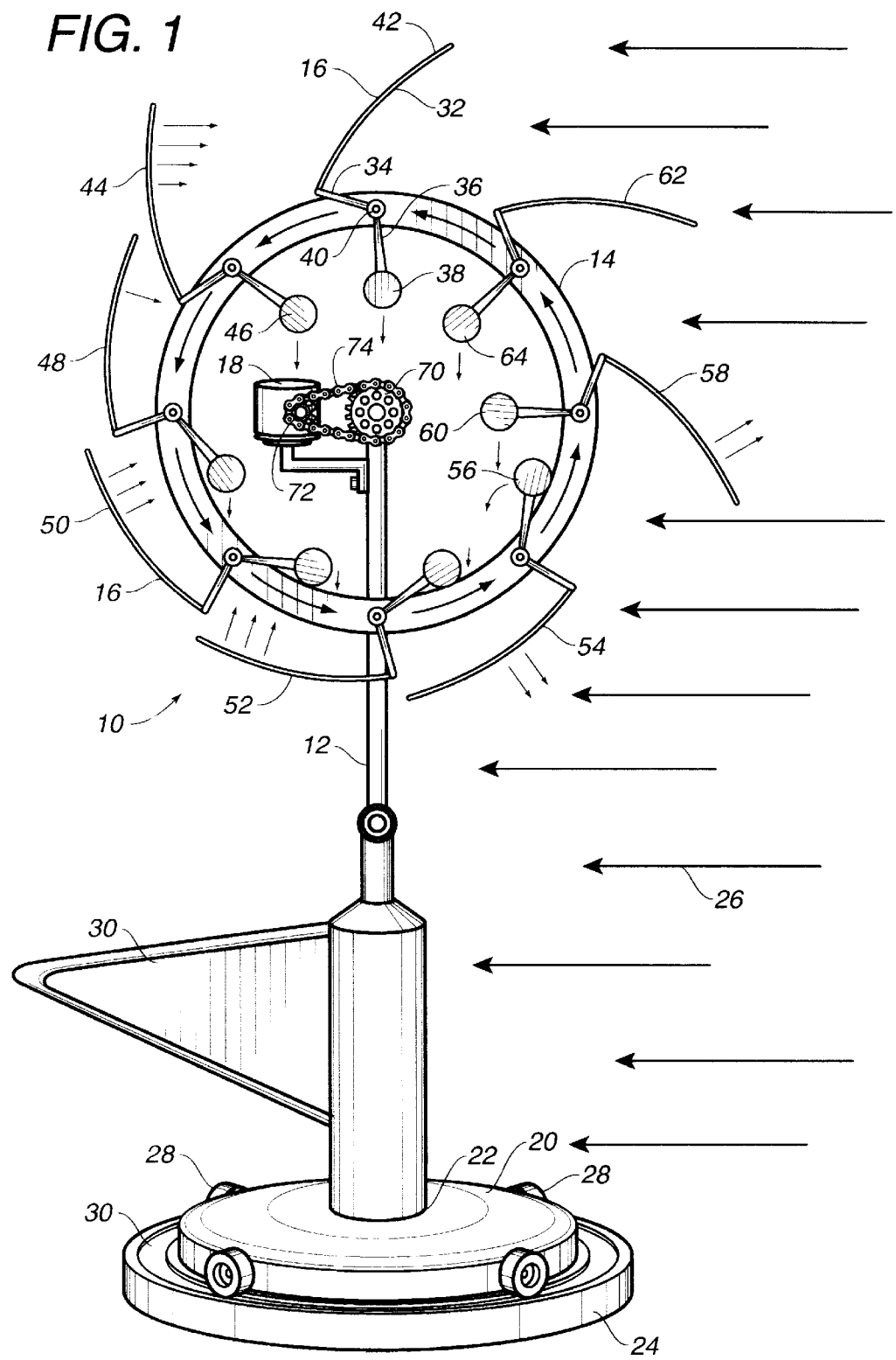
FIG. 1 is a side elevational view of the wind powered generator apparatus of the present invention.

Referring to FIG. 1, there is shown at 10 the wind powered generator apparatus in accordance with the teachings of the present invention. The wind powered generator apparatus 10 includes a support member 12, a rim 14 rotatably connected to the support member 12, a plurality of blade members 16 pivotally connected to the rim 14, and a generator 18 which is connected to the rim member 14 for producing an electrical output relative to a rotation of the rim.

As can be seen in FIG. 1, the support member 12 is a structural member which serves to maintain the rim 14 in its rotatable condition above a base 20. The base 20 is affixed to the end 22 of the support member 12. The base is rotatably mounted within a track 24 such that the base 20 is movable relative to a direction of the wind. Arrows 26 show the direction of wind. In particular, the base 20 includes wheels 28 extending outwardly therefrom. Each of the wheels 28 is received within the circular track 24. The track 24 includes an interior race 30 for receiving the wheels 28. As such, as the support member 12 rotates relative to the direction of the winds 26, the wheels 28 will rotate so as to cause the base 20 to rotate in correspondence with the movement of the support member 12.

A vane 30 is affixed to the support member 12 below the rim 14. The vane serves to move the support member 12 such that the axis of rotation of the rim 14 is transverse to the direction of winds 26. The vane 30 is a triangular-shaped planar member which extends outwardly from the support member 12 transverse to the longitudinal axis of the support member 12. The vane 30 operates in the manner of standard vanes in which it tends to move the direction of least resistance relative to the direction of winds 26. By the action of the vane member 30 rotating the support member 12, the rim 14 is placed in its optimal position relative to the direction of winds 26. In particular, the axis of rotation of the rim 14 will be transverse to the direction of winds 26.

The rim 14 is a circular rim which serves to support the blade member 26. The rim 14 can have various configurations. In the preferred embodiment of the present invention, the rim 14 will have a somewhat "bicycle wheel-like configuration". However, the rim 14 can be a disk which has the blade member 16 supported on a surface thereof. Various other forms for the rim 14 can be configured within the teachings of the present invention. Ideally, the rim 14 should have a configuration which is not resistive to the direction of winds 26 passing thereby. The rim 14 should have suitable structural integrity to support the plurality of blade members 26 thereon.

As can be seen in FIG. 1, each of the plurality of blade members 26 includes a panel 32, an arm 34, a strut 36 and a counterweight 38. The panel 32 has a curved surface facing the direction of winds 26 when the blade member 16 is in its wind-capturing position. The arm 34 is connected to an end of the panel 32 and extends inwardly from the end of the panel 32. The arm 34 is pivotally connected at 40 to the rim 14. The arm 34 extends at an acute angle of between 45 degrees and 90 degrees with respect to the surface of panel 32. The end of the arm 34 opposite the panel 32 is pivotally connected at pivot point 40 to the rim 14. The counterweight of the present invention includes the counterweight 38 with its associated strut 36. Strut 36 is connected to the arm 34 at the pivot point 40. The strut 36 extends outwardly from the arm 34 at an obtuse angle. The counterweight 38 is connected to the end of the strut 36 opposite the pivot point 40. As such, the movement of the counterweight 38 will correspond with the movement of the arm 34. Counterweight 38 and its associated strut 36 should have a weight which is not less than the weight of the panel 32 and the arm 34. The counterweight 38 serves to move the arm 34 and the panel 32 from the wind-passing position to the wind-capturing position during the rotation of the rim 14.

As can be seen in FIG. 1, the blade members 16 are shown in a wind-capturing position and a wind-passing position around the diameter of rim 14. The uppermost blade members 16 are in the wind-capturing position. The lowermost blades 16 are in the windcapturing position. As used herein, the term "wind-capturing position" means that the blades 16 are adjacent to the outer diameter of the rim 14 so as to present an aerodynamic profile to the direction of wind 26. The wind-capturing position of the blades 16 extends radially outwardly from the rim 14 so as to receive maximum force from the wind 26. The counterweight 38 is designed so as to move the blade member 16 from their wind-passing position to their windcapturing position during the rotation of rim 14 as described hereinafter.

Initially, individual blade 42 is shown in its outwardly extending wind-capturing position. The counterweight 34 has drawn the blade 42 into this uppermost position since the counterweight 38 exerts a force, directly vertically downwardly. This causes the strut 36 to direct the arm 34 and the associated panel 32 into this uppermost position. As such, the wind 26 will contact the curved surface of the panel 32 so as to cause the rim 14 to rotate in a counterclockwise manner.

Blade 44 is positioned behind the blade 42. When blade 44 assumes the position shown in FIG. 1, a lesser amount of wind contact will be obtained. As such, the force of the counterweight 46 associated therewith will tend to draw the blade 44 inwardly toward the outer diameter of the rim 14. Blades 48, 50, and 52 are shown in their wind-passing position adjacent to the outer diameter of the rim. As such, these blades 48, 50 and 52 will be in aerodynamic configurations so as to not be resistive to the passing of the wind 26.

Blade 54 is being pulled upwardly by the action of wind acting on blades 42 and 44. As such, counterweight 56 will be in an uppermost position. The arrow associated with counterweight 56 shows the direction in which the counterweight desires to travel as the rim 14 rotates. Eventually, the blade 58 will be drawn upwardly by the force of its counterweight 60. As such, the blade 58 is being drawn into its wind-capturing position. Blade 62 is shown as being aligned with the direction of wind 26 and being drawn upwardly by the action of its counterweight 64.

In the present invention, the action of the counterweights both causes the respective blades to be placed into a wind-capturing or a wind-passing position and the counterweights tend to facilitate the rotation of the rim 14. When the blades extend inwardly, the counterweights will tend to cause the rim 14 to further rotate in a counterclockwise manner. The action of the wind acting on the blades in their wind-capturing position will enhance the rotational speed caused by the action of the counterweights. As such, the counterweights and the blades tend to act in a synergistic manner so as to enhance the speed and duration of rotation of the rim 14.

As can be seen in FIG. 1, the rim 14 is connected to a sprocket 70 at the axis of rotation. As such, the sprocket 70 will rotate in correspondence with the rotation of the rim 14. Another sprocket 72 is connected to the generator 18. An endless belt 74 connects the sprocket 70 to the sprocket 72. The sprocket 70 has a greater diameter than the sprocket 72. As such, a single rotation of the rim 14 will cause multiple rotations of the rotor of the generator 18. As such, the ability to generate power by the generator apparatus 10 of the present invention is enhanced.

Figure 2:
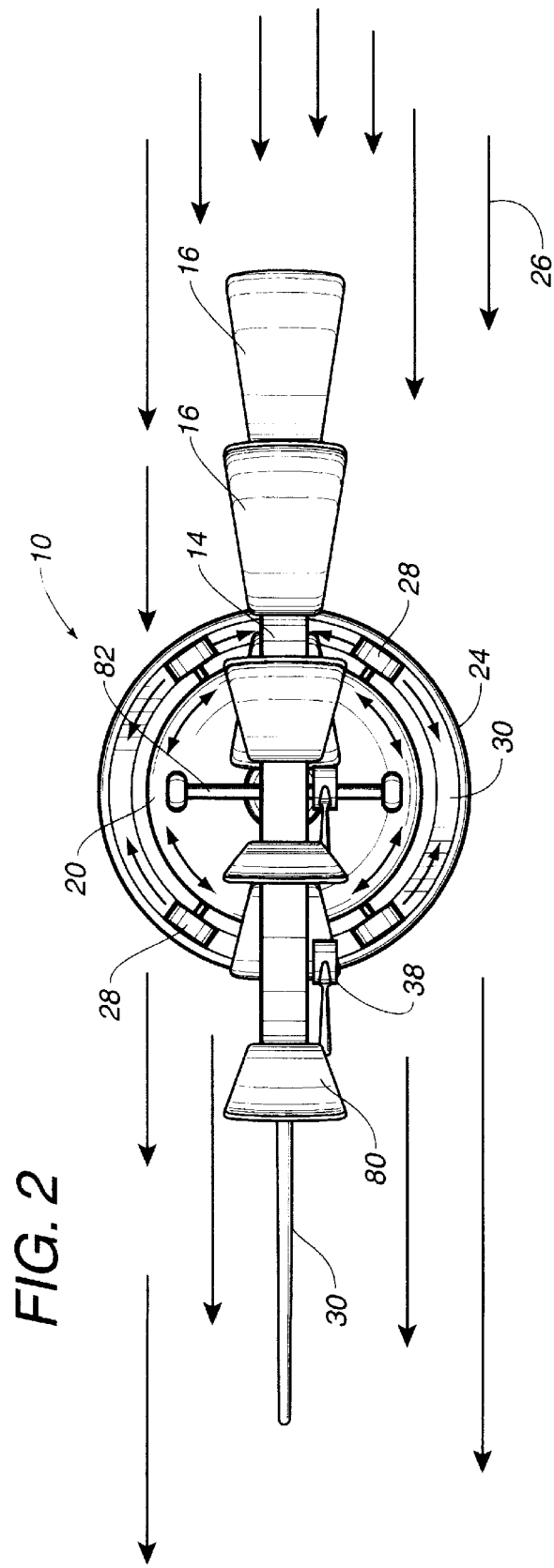
FIG. 2 is a plan view of the wind powered generator apparatus of the present invention.

FIG. 2 shows the wind powered generator apparatus 10 of the present invention. In FIG. 2, it can be seen that the blades 16 are mounted on the rim 14. The counterweight 38 is shown as extending outwardly of one of the blades 80. The rim 14 will rotate about the axis of rotation 82. Vane 30 is shown as extending outwardly of the rim 14 adjacent to the base member 20. In particular, FIG. 2 shows the arrangement of the track 24 with its interior race 30. Wheels 28 of the base member 20 are received within the race 30 of the track 24. As such, the support member 12 can rotate such that the blades 26 optimally face the direction of wind 26.

In FIG. 3, there is shown an alternative embodiment 100 of the wind powered generator apparatus of the present invention. Embodiment 100 incorporates the use of a venturi tube 102 for enhancing the effect of wind 104 upon the action of the wind powered generator of the present invention. In particular, it can be seen in FIG. 3 that a plurality of blades 106 extend outwardly from a rim 108. The venturi 102 is arranged so that it directs the wind 104 toward the upper half of the rim 108. As such, wind is directed, in particular, to those blades 106 that are in the "wind-capturing" position. If necessary, the venturi 102 can be adapted so as to block any wind effects from affecting those blades in their wind-passing position.

FIG. 4 shows the venturi tube 102 in its manner of passing wind 104 toward the blades 106. The venturi tube 102 has a longitudinal axis which extends transverse to the axis of rotation 112 of the rim 108. By having a widened inlet 114 and a narrow outlet 116, the venturi tube 102 serves to greatly enhance the speed of wind passing from the outlet 106. The outlet 106 is positioned adjacent to the wind-capturing blades 106 so as to increase the speed of rotation of the rim 108. The venturi tube 102 can be configured so as to rotate with the wind powered generator apparatus 100 so that the venturi tube 102 is always in a position in which the inlet 114 faces the direction of wind 104.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

What is claimed is:

1. A wind powered generator, apparatus comprising:
a support member;
a rim rotatably connected to said support member, said rim having an axis of rotation;
a plurality of blade members pivotally mounted on said rim, each of said plurality of blade members movable between a wind-capturing position and a wind-passing position as said rim rotates; and
a generator means connected to said rim for producing an electrical output relative to a rotation of said rim;
a base affixed to an end of said support member opposite said rim, and being rotatably mounted within a track such that said base is movable relative to a direction of wind, and having a plurality of wheels extending outwardly therefrom, said wheels being received within a circular track,
vane means affixed to said support member, said vane means for moving said support member such that said axis of rotation is transverse to a direction of wind;
each of said plurality of blade members comprising:
a panel; and
an arm extending inwardly from an end of said panel, said arm being pivotally connected to said rim:
wherein said arm extending at an angle of between 45 degrees and 90 degrees with respect to a surface of said panel, said arm having an end opposite said panel that is pivotally connected to said rim;
a counterweight means connected to said arm, said counterweight means for moving said panel from said wind-passing position to said wind-capturing position during a rotation of said rim.

2. The apparatus of claim 1, said vane means comprising a planar member extending outwardly from said support member transverse to a longitudinal axis of said support member, said vane means positioned below said rim.

3. The apparatus of claim 1, said panel having a curved surface.

4. The apparatus of claim 1, said counterweight means comprising:
a counterweight connected to said arm at the pivotal connection of said arm with said rim, a movement of said counterweight corresponding to a movement of said arm.

5. The apparatus of claim 4, said counterweight having a strut extending outwardly from said arm to an obtuse angle.

6. The apparatus of claim 4, said counterweight having a weight not less than weight of said panel and said arm.

7. The apparatus of claim 1, said panel of one of said plurality of blade members being in overlapping relationship with a panel of an adjacent blade member when the panels are in the wind-passing position.

8. The apparatus of claim 1, said panel extending angularly outwardly of said rim in said wind-capturing position, said panel extending adjacent to said rim in said wind-passing position.

9. The apparatus of claim 1, each of said plurality of blade members being evenly spaced from an adjacent blade member around said rim.

10. The apparatus of claim 1, said rim being connected to a sprocket at said axis of rotation, said generator means having a sprocket connected thereto, an endless belt being connected to said sprocket at said axis of rotation and to said sprocket of said generator means.

11. The apparatus of claim 10, said sprocket at said axis of rotation being of a greater diameter than said sprocket of said generator means.

12. The apparatus of claim 1, further comprising:
a venturi tube positioned so as to have a longitudinal axis transverse to said axis of rotation, said venturi tube having a narrow end facing a portion of said plurality of blades.

13. The apparatus of claim 12, said rim having a top half and a bottom half, said venturi tube having an outlet facing said top half.

* * * * *